J. C. KANE.
Wagon-Tire Tightener.
No. 223,518. Patented Jan. 13, 1880.
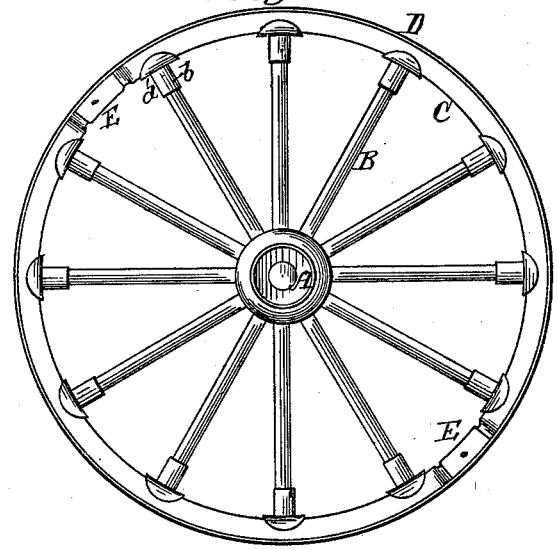
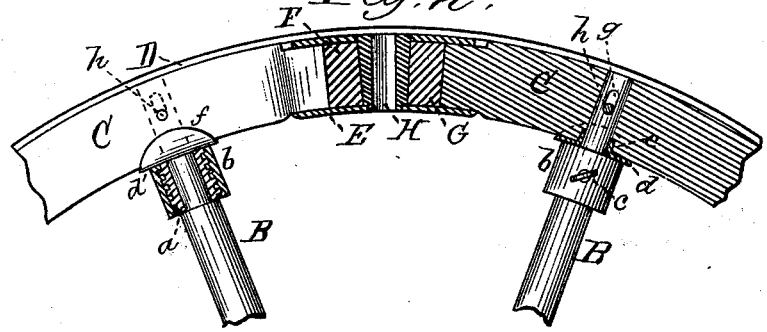
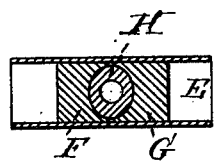
Witnesses
Nat. E. Oliphant
Geo. B. Porter
Inventor
Josiah C. Kane,
per Chas. H. Fowler,
Attorney

UNITED STATES PATENT OFFICE.

JOSIAH C. KANE, OF COLUMBUS, ILLINOIS.

WAGON-TIRE TIGHTENER.

SPECIFICATION forming part of Letters Patent No. 223,518, dated January 13, 1880.

Application filed Deember 3, 1879.

*To all whom it may concern:*

Be it known that I, JOSIAH C. KANE, of Columbus, in the county of Adams and State of Illinois, have invented a new and valuable Improvement in Wagon-Tire Tighteners; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front elevation of a wheel embodying my invention. Fig. 2 is a section of wheel on an enlarged scale embodying my invention. Fig. 3 is a detailed view, in section, of the means employed for expanding the rim of the wheel.

The present invention has relation to wheels used upon wagons and other vehicles, and the object thereof is to provide means that will be simple, convenient, amd effective for tightening and securing tires upon the fellies of wheels in order to compensate for the swelling or shrinkage thereof.

The invention consists in the peculiar construction of a device which is attached to the fellies of the wheel so that the rim may be contracted or expanded whenever required to cause the rim to fit the tire snugly, and thereby avoid the necessity of cutting and rewelding the tire, as is usually done when the same becomes loose.

In the accompanying drawings, A represents the hub, B the spokes, C the fellies, and D the tire, of the wheel. Each spoke has around that end which is connected to the rim or fellies of the wheel a ferrule, *a*, having screw-threads upon its exterior to engage with a screw-threaded sleeve, *b*, the same being provided with a set-screw, *c*, to hold the sleeve in the required position upon the ferrule. The end of the spoke B is somewhat reduced in diameter where it enters the fellies C, and also that portion of the spoke over which fits the ferrule *a*. The end of the spokes passes through plates *d*, formed with an annular flange, *e*, around the openings through which the ends of the spokes pass, said annular flange fitting tightly into the opening of the fellies, and the lips *f* embracing the sides thereof. The upper end of the sleeve *b* presses against the under side of the plate *d*, so that when the rim of the wheel is expanded in the manner hereinafter described each and every spoke is increased in length from the hub to the rim of the wheel by simply screwing up the sleeve *b* a sufficient distance to compensate for the expansion or contraction of the rim.

To prevent the spoke from turning or twisting in the fellies when the sleeve *b* is screwed up or down upon the ferrule *a*, the upper end of the spoke is formed with an elongated opening, *g*, through which enters a pin, *h*, from the outside of the fellies.

A hollow section, E, receives the reduced ends of the fellies C between each joint of the rim of the wheel. The hollow section E contains two followers, F G, their inner or opposite ends being concave, to fit around or embrace a key, H, which passes through a vertical opening in the section. This key H is of elliptical form, or, in other words, greater at one direction of its diameter than the other, as illustrated in Fig. 3, so that when the key is turned in a direction to bring its greatest diameter in contact with the ends of the followers F G they will be forced in a direction against the ends of the fellies, which, in turn, will be forced outward, thereby increasing the diameter of the rim of the wheel, after which the spokes can be lengthened to the extent required and in the manner previously stated.

The ends of the fellies are tenoned so as to nicely fit into the ends of the hollow section, and they are also formed with shoulders upon that portion next to the tire of the wheel, said shoulders entering recesses on the upper part and ends of the section E.

The key H may be so constructed that it can be held and turned by a wrench or any other suitable tool adapted to the purpose; or it may have a square or other form of opening for the reception of a rod of similar form, as found most convenient, and when the key is turned in the position required it may be held by a set-screw or other suitable means.

Having now fully described my invention, what I claim as new, and desire to secure by Letters Patent, is—

The hollow section E and the followers F G, in combination with the elliptical key H, substantially as and for the purpose specified.

In testimony that I claim the above I have hereunto subscribed my name in the presence of two witnesses.

JOSIAH C. KANE.

Witnesses:
 HENRY L. REYNOLDS,
 STEPHEN H. KEMP.